United States Patent
Orii

(10) Patent No.: US 10,198,602 B2
(45) Date of Patent: Feb. 5, 2019

(54) CARD PROCESSING DEVICE AND A CONTROL METHOD OF CARD PROCESSING DEVICE

(71) Applicant: NIDEC SANKYO CORPORATION, Suwa-gun, Nagano (JP)

(72) Inventor: Tsutomu Orii, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/718,830

(22) Filed: Sep. 28, 2017

(65) Prior Publication Data

US 2018/0129833 A1    May 10, 2018

(30) Foreign Application Priority Data

Sep. 30, 2016  (JP) ................................. 2016-193574

(51) Int. Cl.
  *G06K 7/08*  (2006.01)
  *G06Q 30/00*  (2012.01)

(52) U.S. Cl.
  CPC ......... *G06K 7/087* (2013.01); *G06Q 30/0185* (2013.01)

(58) Field of Classification Search
  None
  See application file for complete search history.

(56) References Cited

U.S. PATENT DOCUMENTS

2010/0252630 A1* 10/2010 Miyazawa ............. G06K 13/08
                                                                235/441
2016/0234416 A1*  8/2016 Xiao ......................... G06T 7/80

FOREIGN PATENT DOCUMENTS

| JP | 2004342086 A | 12/2004 |
| JP | 2016193574 A | 11/2016 |
| WO | 2008149529 A1 | 12/2008 |

* cited by examiner

*Primary Examiner* — Kristy A Haupt
(74) *Attorney, Agent, or Firm* — Cantor Colburn LLP

(57) ABSTRACT

A card processing device with which a user operates a card by hand may include a card-inserting section at which the card is inserted; a card-storing section structured to store the card while a rear end portion of the inserted card is exposed from the card-inserting section; a reading section structured to read recorded information on the card stored in the card-storing section; a first detecting section structured to detect that the card is inserted to the card-storing section from the card-inserting section; a second detecting section, arranged on the farther side than the first detecting section in the inserting direction of the card, structured to detect that the card is inserted; and a status-monitoring section structured to detect fraud from the relation of the detections of the card at the first detecting section and the second detecting section.

7 Claims, 6 Drawing Sheets

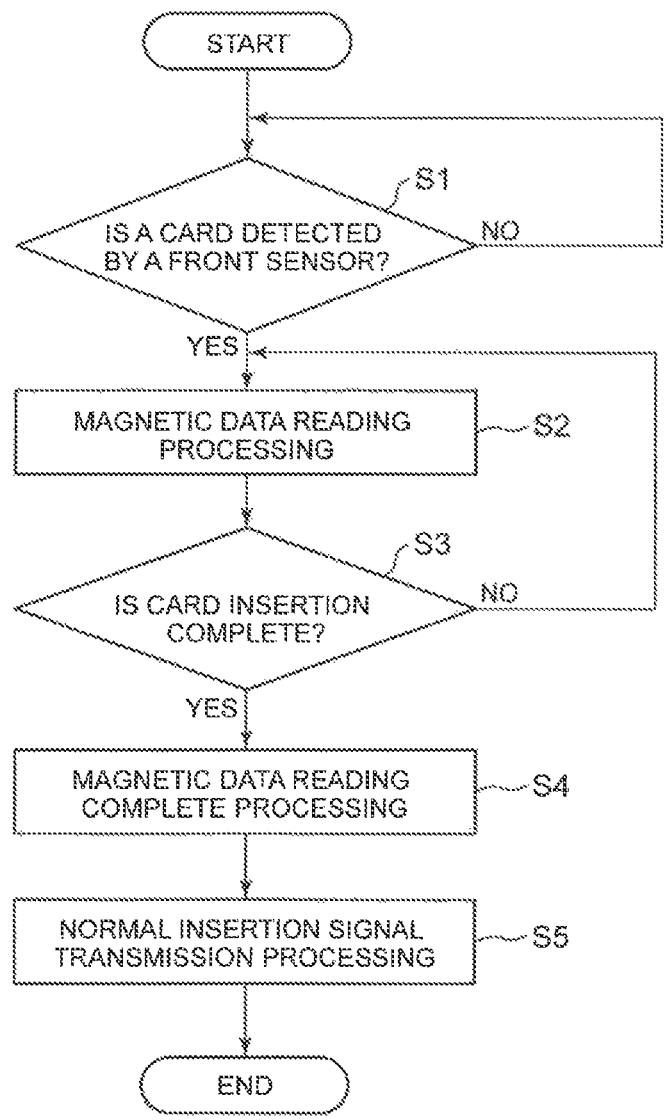

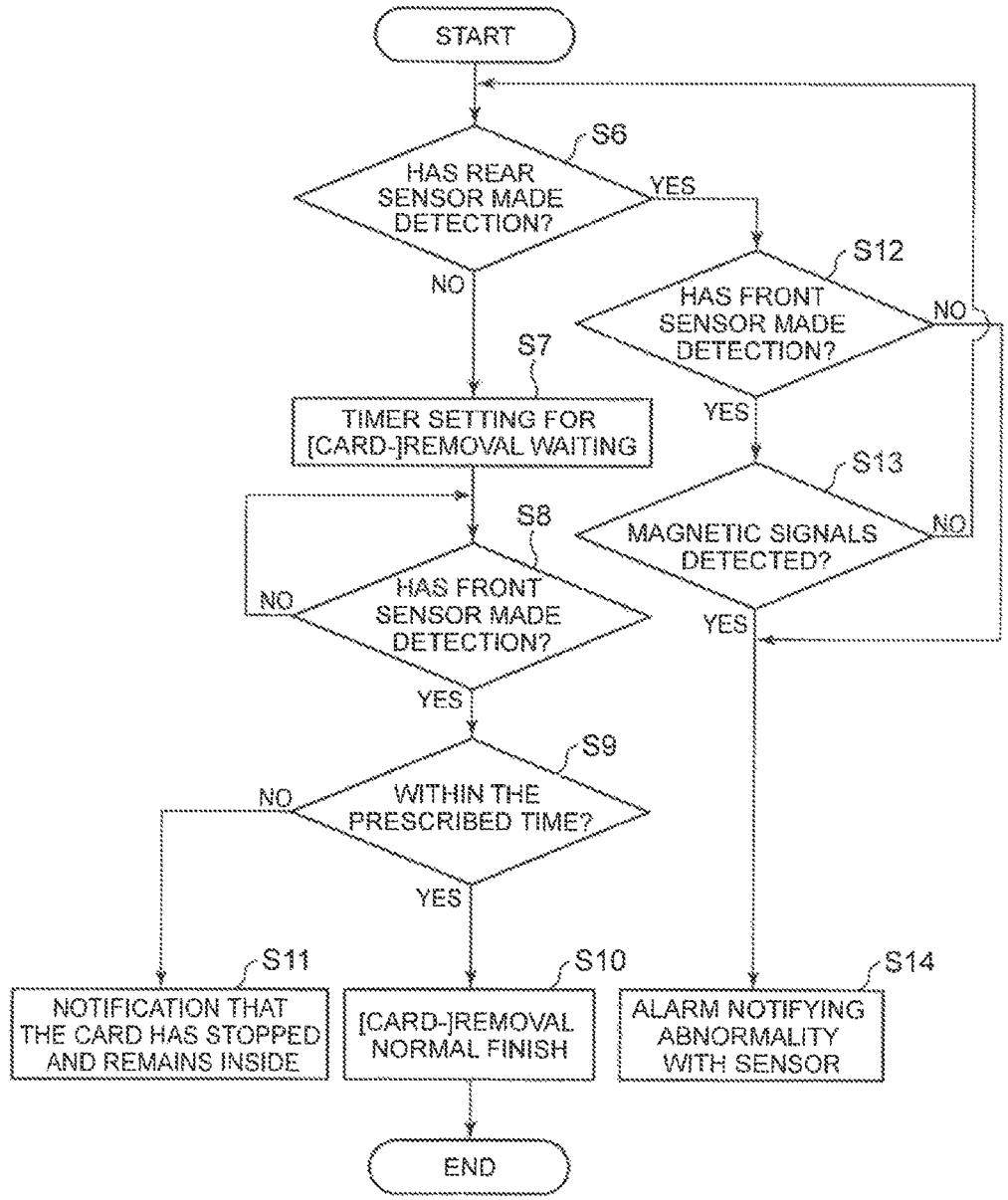

CARD PROCESSING DEVICE AND A CONTROL METHOD OF CARD PROCESSING DEVICE

CROSS REFERENCE TO RELATED APPLICATION

The present invention claims priority under 35 U.S.C. § 119 to Japanese Application No. 2016-193574 filed Sep. 30, 2016, the entire content of which is incorporated herein by reference.

FIELD OF TECHNOLOGY

At least an embodiment of the present invention relates to a card processing device and a control method of the card processing device.

BACKGROUND

Referring to Patent Reference 1, for example, a conventional, manual card processing device is disclosed, in which data recorded on a card is processed while a user operates the card by hand (hereinafter called conventional technology 1). The card processing device of the conventional technology 1 is a dip-type card reader that reproduces data when a card is inserted therein or the card is removed therefrom. A card processing device like the card reader of the conventional technology 1 may be used in an arcade or casino and configured to give points according to the duration of a game-playing session or manages a game-playing session while the player's card is being inserted therein. In such a case, it is necessary to prevent a player from forgetting to remove the card from the card processing device or prevent the card from being stolen.

Patent Reference 2 discloses a conventional card processing device equipped with two sensors to detect the insertion of a card, which are a front sensor arranged on the entrance side of a card travel path and a rear sensor arranged on the far side of the card travel path (hereinafter, conventional technology 2). The card processing device of the conventional technology 2 is also equipped with a timer unit which, when monitoring the removal of the inserted card, measures prescribed time from the time when the card is no longer detected by the rear sensor and the card has passed the rear sensor. Monitoring the removal of the inserted card, the card processing device of the conventional technology 2 anticipates "card removal" when the card cannot be detected by the rear sensor any longer, starts the timer for measuring the prescribed time once the card has left the rear sensor, and handles the situation in which the card removal is suspended in the middle of the device if the card is not detected by the front sensor within the given time.

[Patent reference 1] International Publication 2008/149529
[Patent reference 2] Japanese Unexamined Patent Application 2004-342086 Publication The card processing device of the conventional technology 1 or 2 is configured such that, while monitoring the removal of a card, it anticipates the card passing by the rear sensor, and upon detection of the card passing, anticipates the card passing by the front sensor. Therefore, unless the rear sensor confirms that the card has passed by, the removal of the card cannot be judged. For this reason, when a light-shielding object is forced into the card processing device together with the card by a fraudulent player, the light-shielding object may stay inside and is detected by the rear sensor, making it difficult to detect the removal of the card. As a result, the card removal judgement itself cannot be done.

SUMMARY

Then, at least an embodiment of the present invention is devised considering such a situation and provides a card processing device that can increase security measure against fraudulent operations. Also, at least an embodiment of the present invention provides a control method of a card processing device that can increase security measures against fraudulent operations.

A card processing device of at least an embodiment of the present invention is a manually-operated card processing device with which a user operates a card by hand, and comprises a card-inserting section at which said card is inserted, a card-storing section which stores the card while the rear end portion of the inserted card is exposed from the card-inserting section, a reading section for reading the recorded information on the card, which is stored in the card-storing section, a first detecting section which detects that the card is inserted to the card-storing section from the card-inserting section, a second detecting section which is arranged on the far side in the card inserting direction, compared to the first detecting section, and a status-monitoring section which detects fraudulent operations referring to the relation of the detections of the card at the first detecting section and at the second detecting section. Configured in this way, the card processing device can judge and warn that something abnormal has happened at the first detecting section when, although the second detecting section has detected the card insertion, the first detecting section does not detect the card insertion, thus providing higher security measures than a conventional device against a fraudulent operation such as an illegal removal of the inserted card.

The card processing device of at least an embodiment of the present invention is featured with the status-monitoring section which is equipped with an alarm unit to notify that the card is illegally processed. Configured in this way, higher security measures than a conventional device can be provided against fraudulent operations.

The card processing device of at least an embodiment of the present invention is featured with the first detecting section and the second detecting section which are mechanical detecting means respectively equipped with a contact member with which the card is to contact and a sensor for detecting the positional change of the contact member. By configuring the processing device in this way, a card medium of any kind can properly be detected by the first detecting section even if the card is a nonstandard card such as a transparent card medium or a card with round corners which makes it difficult to be detected by an optical detecting means that detects the card medium when the card medium passes between a light-emitting element and a light-receiving element.

The card processing device of at least an embodiment of the present invention is featured with the status-monitoring section which detects an output signal sent from the reading section and, together with reference to the relation of the card detections at the first detecting section and at the second detecting section, detects fraudulent operations. Configured in this way, even if the card processing device is tampered with, a warning can be issued to a legal user who inserts a card next, so that the next user can act with a countermeasure.

A control method for a card processing device of at least an embodiment of the present invention is a method of controlling a card processing device, which is implemented by a manually-operated card processing device with which a user operates a card by hand, wherein the card processing device is equipped with a card-inserting section at which the card is inserted, a card-storing section which stores the card while the rear end portion of the inserted card is exposed from the card-inserting section, a reading section for reading the recorded information on the card, which is stored in the card-storing section, a first detecting section which detects that the card is inserted to the card-storing section from the card-inserting section, and a second detecting section which is arranged on the far side in the card inserting direction, compared to the first detecting section, so that a fraudulent operation can be detected referring to the relation of the card detections at the first detecting section and at the second detecting section. By configuring the processing device in this way, a higher security measures than a conventional device can be provided against a fraudulent operation.

According to at least an embodiment of the present invention, a status-monitoring section is provided to detect fraud referring to the relation of the card detections at the first detecting section and at the second detecting section in order to provide a card processing device with a higher security measures against fraudulent operations.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which:

FIG. 3A is an A-A' cross section when a card is not inserted; FIG. 3B is an A-A' cross section when a card is inserted.

FIG. 5 is a flowchart of a card insertion processing of the embodiment of the present invention.

FIG. 6 is a flowchart of a card removal processing of the embodiment of the present invention.

DETAILED DESCRIPTION

Figure 1:
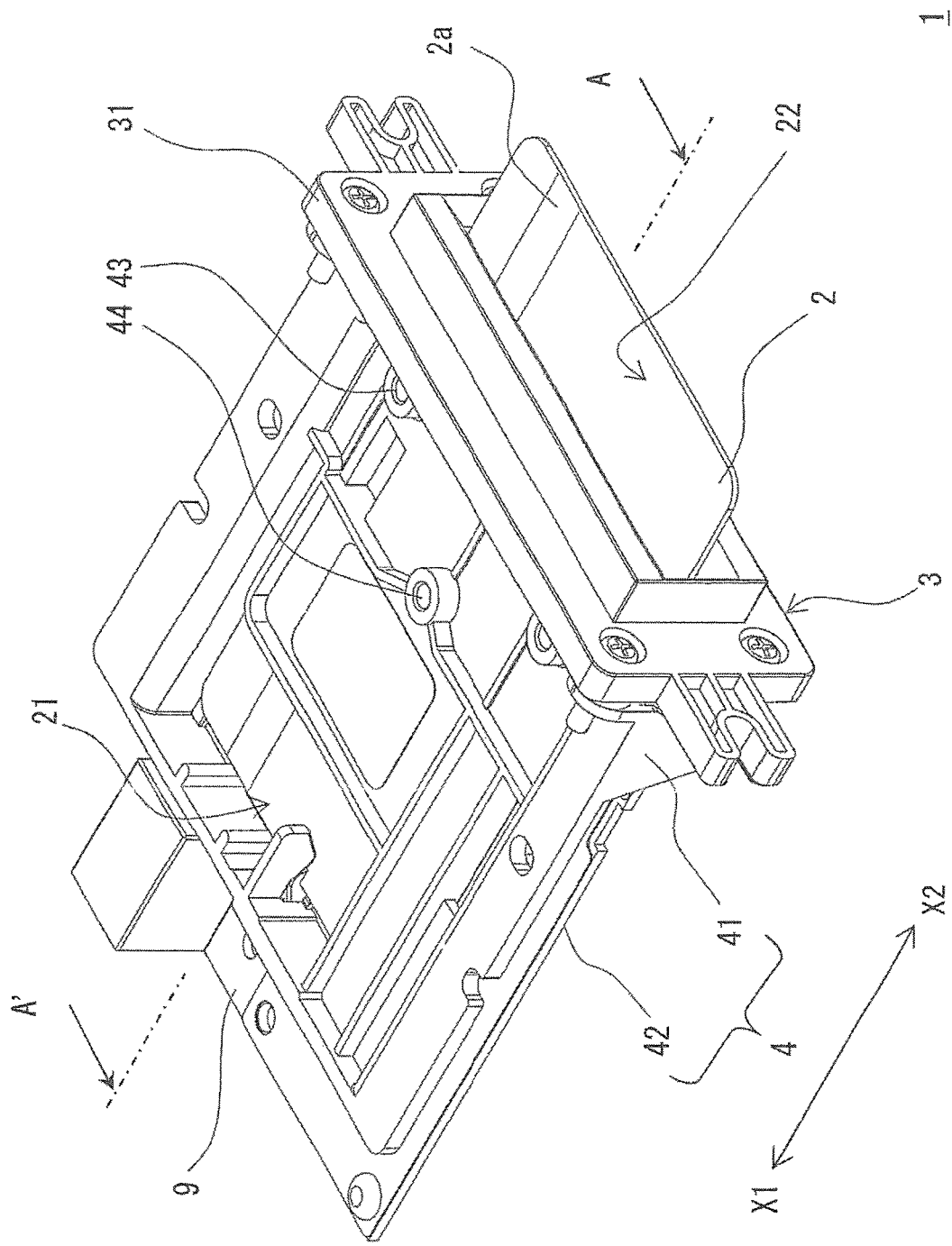
FIG. 1 is a perspective view of the exterior configuration of a card processing device of an embodiment of the present invention.

At least an embodiment of the present invention is hereinafter described referring to the drawings.

[Configuration of Card Reader 1]

Figure 2:
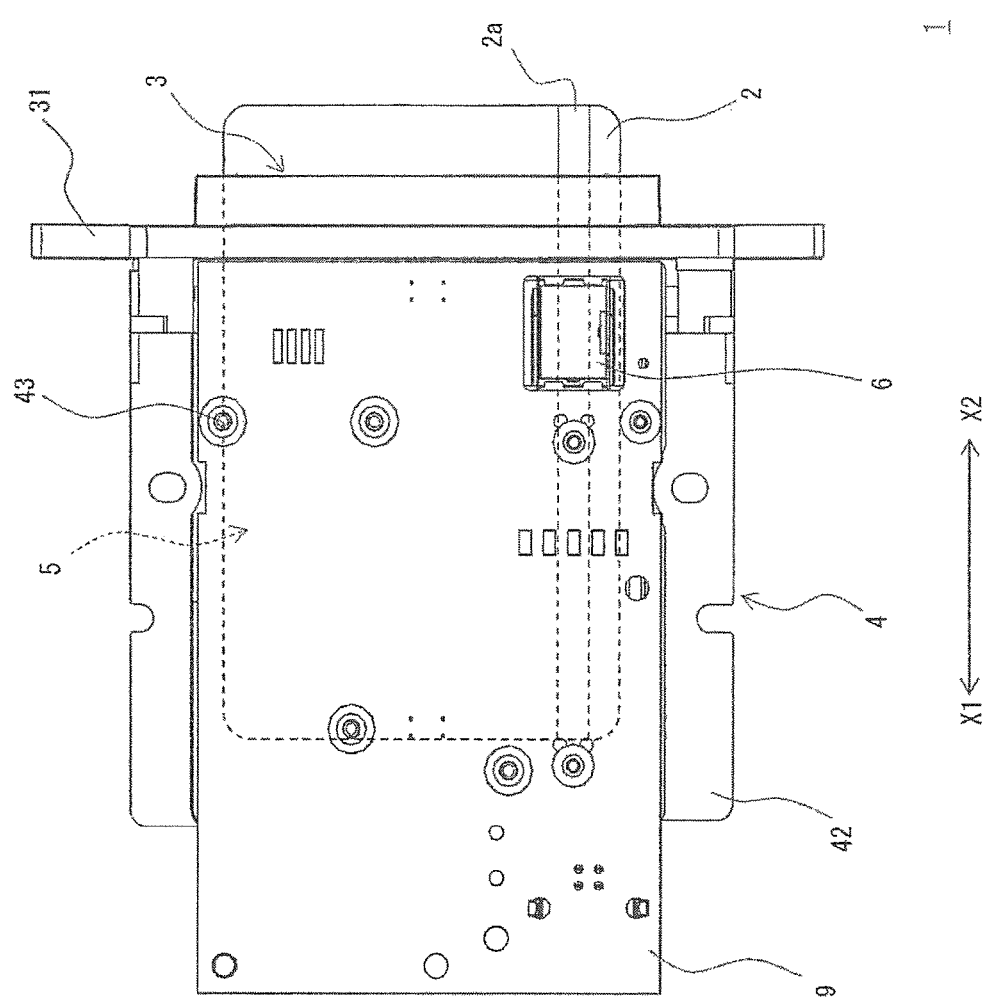
FIG. 2 is a bottom view of the card processing device of FIG. 1, showing an example of the positional relationship of the sections including a circuit board which contains various circuits to control each section.
Figure 3A:
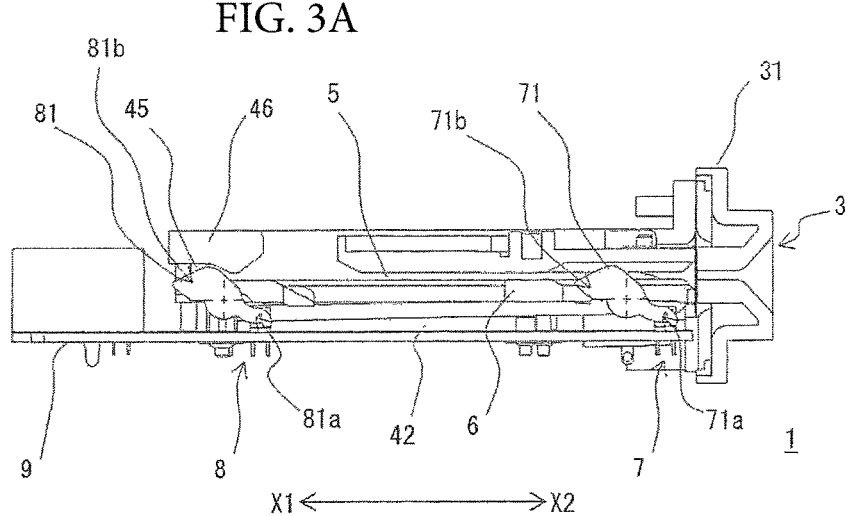
FIGS. 3A and 3B are cross-sectional views of the card processing device shown in FIG. 1.
Figure 3B:
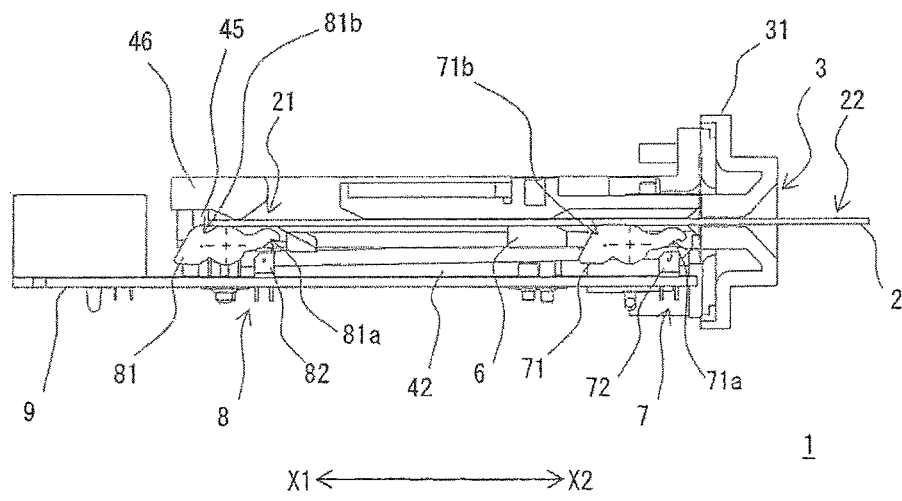
Figure 4:
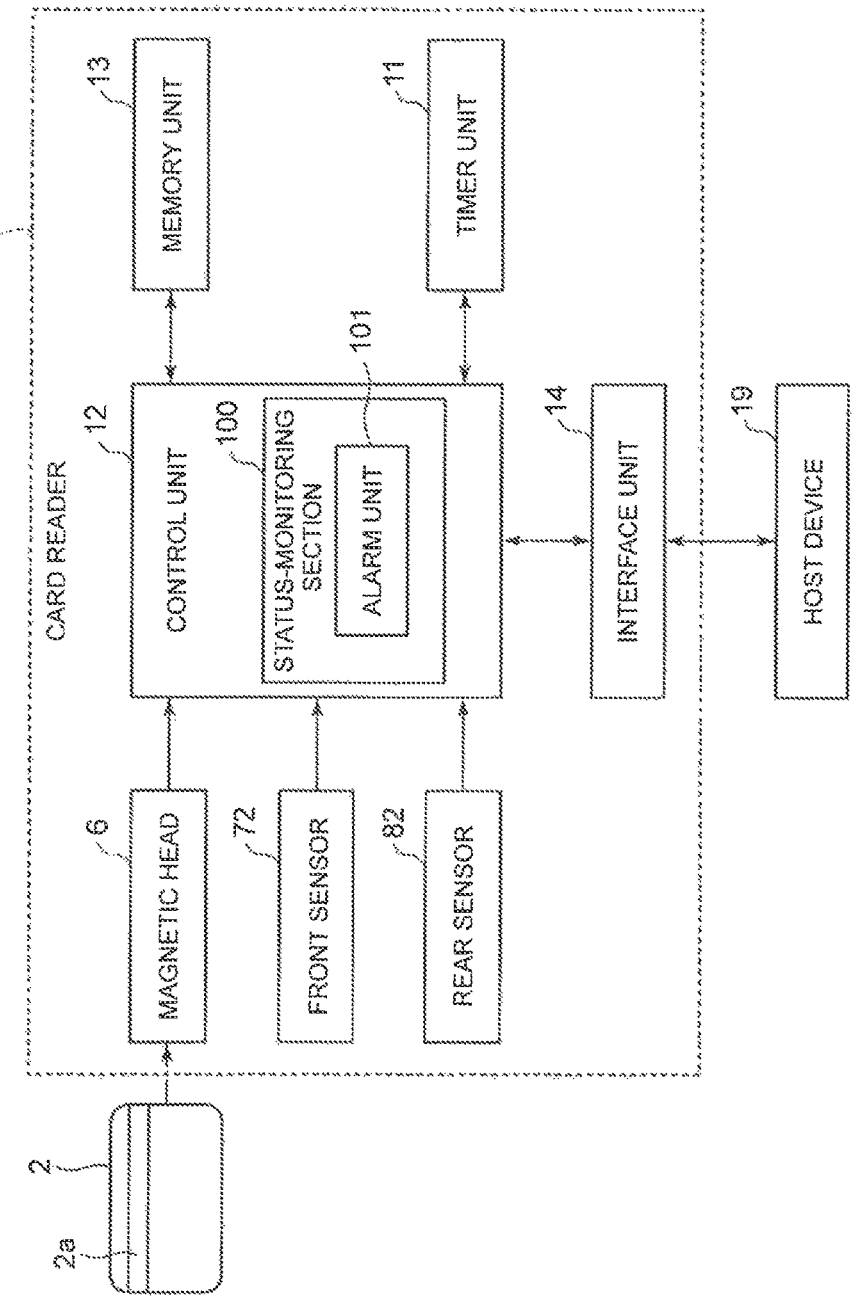
FIG. 4 is a block diagram of the control configuration of a control unit provided on the circuit board shown in FIG. 2 and its peripherals.

FIG. 1 is a perspective view of the exterior configuration of a card reader 1 of this embodiment of the present invention. FIG. 2 is a bottom view of an example of the card reader 1 of at least an embodiment of the present invention when a circuit board containing various circuits to control each section is provided. FIGS. 3A and 3B show cross sections of the card reader 1 of FIG. 1. FIG. 3A is a A-A' cross section of the card processing device shown in FIG. 1 when a card is not inserted therein; FIG. 3A is a A-A' cross section of the card reader 1 shown in FIG. 1 when a card is inserted therein. FIG. 4 is a block diagram of the control configuration of a card processing device shown in FIG. 2.

The card processing device of this embodiment of the present invention is a card reader which, while a user operates a card 2 by hand, reproduces data recorded on the card 2. More specifically described, the card processing device of this embodiment is a so-called dip-type card reader which reproduces data recorded on the card 2 when a user inserts the card 2 into the device and pulls the card 2 out of the device by hand.

The card processing device of this embodiment is hereinafter called "card reader 1".

The card reader 1 is also used at an arcade or casino to give points to a user of the card 2 according to the duration of the game, measuring how long the card 2 is kept inserted in the card reader 1, and to administer the playing status. Therefore, the card reader 1 is mounted and used in a prescribed host device 19 which is a game machine at an arcade or casino.

As shown in FIG. 1 through FIGS. 3A and 3B, the card 2 is inserted in the X direction and pulled out in the X2 direction in this embodiment. In other words, the X1 direction is the inserting direction of the card 2. Also, the X1 direction side is the far side in the inserting direction of the card 2. The X2 direction is the front side in the card inserting direction. Hereinafter, the X1 direction is the "far" side and the X2 direction side is the "front" side.

The card 2 is a rectangular vinyl chloride card-like magnetic recording medium having the thickness of 0.7 to 0.8 mm. On one side of the card 2 a magnetic strip 2a is formed so that magnetic signals are recorded thereon as recorded information. The use of the card 2 is not particularly specified; however, as described above, it may be used as a user ID card which is used at an arcade or casino. Note that the card 2 may be a PET (polyethene terephthalate) card having the thickness of 0.18 to 0.36 mm or a paper card.

As seen in the exterior configuration shown in FIG. 1 though FIGS. 3A and 3B, the card reader 1 is equipped with a card-inserting section 3 at which the card 2 is inserted and a card-storing section 4 which stores the card while the rear end portion 22 of the inserted card 2 sticks out from the card-inserting section 3.

The card 2 is inserted at or removed from the card-inserting section 3 by a user. As shown in FIG. 1 and FIGS. 3A and 3B, the card-inserting section 3 has a slit-shaped card inserting opening formed therein for the card 2 to be inserted. The card inserting opening is configured by a member which is tapered toward the inside to facilitate the insertion of the card 2 to a card travel path 5 inside the card reader 1. Also, the card-inserting section 3 is provided with a flange 31 to be attached to a game device. Part of the card 2 inserted into far inside the card reader 1 will stick out from the card-inserting section 3.

The card-storing section 4 stores the card 2 inserted from the card-inserting section 3; as shown on FIG. 1 through FIGS. 3A and 3B, a storing space is created between a top member 41 and a bottom member 42. In other words, the storing space for the card 2 is configured by the top member 41 and the bottom member 42. Also, the top member 41 and the bottom member 42 may be a resin mold, for example. As shown in FIG. 1 through FIGS. 3A and 3B, the top member 41 and the bottom member 42 have connecting holes 43 and 44 which are used to connect the card reader with other members by screws.

The card-storing section 4 has a card travel path 5 formed therein and is provided with a magnetic head 6, a front detecting mechanism 7, a rear detecting mechanism 8 and a circuit board 9.

As described above, the card 2 inserted to the card-storing section 4 is stored while the rear end portion 22 thereof is exposed from the card-inserting section 3 by a prescribed length. The exposed length can be that with which the user can easily hold the card when removing it. As shown in FIG. 2 and FIGS. 3A and 3B, also, the card travel path 5 is formed inside the card-storing section 4 so that the card 2 inserted from the card-inserting opening of the card-inserting section travels on a straight line. In other words, the card travel path 5 is formed to be connected with the card insert opening.

As shown in FIG. 3B, a stopper 45 is provided on the far end of the card travel path 5 in the card-storing section 4. The card 2 gets positioned inside the card-storing section 45 as the front end portion 21 of the card 2 abuts on the stopper 45. Therefore, the card reader of at least an embodiment of the present invention can take any length of the card 2 as long as it is within the range with which the stopper 45 can control the stop of the card according to the type or usage of the card. Also, the card-storing section 4 is provided with a holding member 46 for holding the front end portion of the card at the far side of the card-storing section 4 by pressing, etc. The holding member 46 releases the front end portion 21, which is held at the far side, when the user pulls the card 2 out.

As shown in FIG. 2 and FIGS. 3A and 3B, the magnetic head 6 is arranged on the front side of the card reader 1. In this embodiment, the magnetic head 6 is positioned below the card travel path 5. The magnetic head 6 of this embodiment is a reading section for reading recorded information on the card 2 when the card 2 is stored in the card-storing section 4. More specifically described, the magnetic head 6 reads the recorded information, which is written on the magnetic strip 2a, and reproduces it as a magnetic signal. In the dip-type card reader 1 of this embodiment, when the card 2 is stored in the card-storing section 4 and when the card 2 stored in the card-storing section 4 is pulled out, the magnetic head 6 reads the magnetic signal from each track of the magnetic strip 2a as the magnetic strip on the card 2 is slid. At that time, the magnetic signals from the magnetic strip 2a of the card 2, which are read by the magnetic head 6, are first output as analogue signals. Note that the card reader 1 may be provided with a reading section which is capable of reading recorded information on the card 2 through a contactless transmission means of IC contacts or RF (Radio Frequency) ID.

The front detecting mechanism 7 is a first detecting means for detecting that the card 2 is inserted to the card-storing section 4 from the card-inserting section 3. In this embodiment, the front detecting mechanism 7 is configured as a mechanical detecting means equipped with a sensor plate 71 which is a contact member and a front sensor 72 which detects the positional change of the sensor plate. The front detecting mechanism 7 is arranged on the front side of the card-storing section 4 in the card reader 1. Therefore, the front detecting mechanism 7 normally detects that the card 2 is inserted at the card-inserting opening of the card-inserting section 3.

The rear detecting mechanism 8 is a second detecting means which is arranged on the far side of the card-storing section 4 in the card reader 1 to detect that the card 2 is inserted all the way to the far end of the card-storing section 4. In other words, the rear detecting mechanism 8 detects that the leading edge of the front end portion 21 of the card 2 has reached the far end of the card travel path 5 and thus the card 2 has been completely inserted.

More specifically described, the card 2 is inserted at the card-inserting section 3 by a user, reaches the card-stopping position on the far side, and then is removed in this embodiment. Through these operations, the magnetic signals on the magnetic strip 2a are read by the magnetic head 6. That the card 2 was inserted and has reached to the stopping position is detected by both the front detecting mechanism 7 and the rear detecting mechanism 8.

The circuit board 9 is a print board held by the top member 41 and the bottom member 42 of the card-storing section 4. The circuit board 9 inputs the signals from the front detecting mechanism 7 and from the rear detecting mechanism 8, obtains the magnetic signals from the magnetic head 6, and contains various circuits which control the sections of the card reader 1. The control unit 12 (FIG. 4) on the circuit board 9 can sends the card-holding signals or the card-releasing signals, which correspond to the status of the card 2 detected by the front detecting mechanism 7 and the rear detecting mechanism 8, to the host device 19. In other words, the circuit board 9 includes an interface used to communicate with the host device 19. Also, the circuit board 9 may have the magnetic head 6 and various electronic components mounted thereon, and may be provided with connector components on the far side to exchange the signals with the external device.

The configuration of the front detecting mechanism 7 and the rear detecting mechanism 8 are described more specifically. As shown in FIGS. 3A and 3B, the front detecting mechanism 7 is equipped with the sensor plate 71 and the front sensor 72. The sensor plate 71 is a flat spring formed from a metallic thin plate, and is equipped with a card contact portion 71b for making contact with the card 2 and a light-shielding portion 71a for obstructing between the light-emitting element and the light-receiving element of the front sensor 72. The far end side of the sensor plate 71 is secured to the card-storing section 4, which configures the card travel path 5, and a main frame of the card reader 1 which is not illustrated. The front sensor 72 is an optical sensor equipped with the light-emitting element and the light-receiving element, for example. The front sensor 72 detects the positional change of the sensor plate 71.

As shown in FIG. 3A, when the card 2 is not inserted at the card-inserting opening, part of the card-contacting portion sticks out to the card travel path 5. In this state, the light-shielding portion 71a is not obstructing between the light-emitting element and the light-receiving element of the front sensor 72. On the other hand, as shown in FIG. 3B, when the card 2 is inserted at the card-inserting opening and the surface of the card 2 contacts the card-contacting portion 71b, the sensor plate 71 is flexed and the light-shielding portion 71a is moved to obstruct between the light-emitting element and the light-receiving element of the front sensor 72. Thus, when the light-shielding portion 71a obstructs between the light-emitting element and the light-receiving element of the front sensor 72, the insertion of the card 2 from the card inserting opening is detected.

The rear detecting mechanism 8 is arranged on the far side of the card reader 1. The rear detecting mechanism 8 detects that the card 2 is inserted all the way to the far end of the card reader 1. In other words, the rear detecting mechanism 8 is a second detecting means which is positioned on the farther side in the insertion direction of the card 2 than the front detecting means 7. In the same manner as the front detecting mechanism 7, the rear detecting mechanism 8 is configured as a mechanical detecting means equipped with a sensor plate 81, with which the card 2 makes contact, and a rear sensor 8 for detecting the positional change of the sensor plate 81. In other words, the rear detecting mechanism 8 detects that the leading edge of the card 2 has reached the far end of the card travel path and came to the card-stopping position. More specifically, the rear detecting mechanism 8 detects that the card 2 has been inserted inside the card-storing section 4, made an abutment on the stopper 45 and is in the position being held by the holding member 46.

As shown in FIGS. 3A and 3B, the rear detecting mechanism 8 is equipped with the rear sensor 82 and the sensor plate 81. The sensor plate 81 is a flat spring formed from a metallic thin plate in the same manner as the sensor plate 71, and is equipped with a card-contacting portion 81b with which the card 2 makes contact and a light-shielding portion 81a which obstructs between a light-emitting element and a light-receiving element of the rear sensor 82. The front side of the sensor plate 81 is secured to the card-storing section 4, which configures the card travel path 5, and the main frame of the card reader 1. Also, the rear sensor 82 is an optical sensor which is equipped with the light-emitting element and the light-receiving element, in the same manner as the front sensor 72. The rear sensor 82 detects the positional change of the sensor plate 82.

As shown in FIG. 3A, when the leading edge of the card 2 has not reached the far end of the card travel path 5, part of the card-contacting portion sticks out to the card travel path 5. In this state, the light-shielding portion 81a is not obstructing between the light-emitting element and the light-receiving element of the rear sensor 82. On the other hand, as shown in FIG. 3B, when the leading edge of the card 2 reaches the far end of the card travel path 5 and the surface of the card 2 contacts the card-contacting portion, the sensor plate 81 is flexed and the light-shielding portion 81a is moved to obstruct between the light-emitting element and the light-receiving element of the rear sensor 82. As described, when the light-shielding portion 81a obstructs between the light-emitting element and the light-receiving element of the front sensor 82, that the leading edge of the card 2 has reached the far end of the card travel path 5 is detected.

More specifically described, as shown in FIGS. 3A and 3B, as the card 2 is inserted, the sensor plates 71 and 81 are turned in the direction perpendicular to the travel direction of the card 2 and presses the front sensor 72 and the rear sensor 82 down in the front detecting mechanism 7 and the rear detecting mechanism 8 respectively so that the insertion of the card 2 is detected. When the card 2 is inserted in a normal situation, three detection statuses sequentially come in the distance between the position of the card 2 at the front sensor 72 and at the rear sensor 82 arranged on the far side of the card-storing section 4:

(1) the status in which the output signals are not detected by either the front sensor 72 or the rear sensor 82;
(2) the status in which the output signals are detected only by the front sensor 72, but not by the rear sensor 82;
(3) the status in which the output signals are detected by both the front sensor 72 and the rear sensor 82.

When the card 2 is removed in a normal situation, three detection statuses sequentially come:

(1) the status in which the output signals are detected by both the front sensor 72 and the rear sensor 82;
(2) the status in which the output signals are detected only by the front sensor 72, but not by the rear sensor 82; and
(3) the status in which the output signals are not detected by either the front sensor 72 or the rear sensor 82.

In other words, in the normal processing of reading the card 2, there is no such detection status where the output signals are detected only by the rear detecting mechanism 8 but not by the front detecting mechanism 7. In this embodiment, therefore, a warning can be issued from abnormal sensor activities by detecting a fraudulent operation by referring to the signal detection status corresponding to the statuses of the front detecting mechanism 7 and the rear detecting mechanism and also referring to the magnetic signals from the magnetic heard 6.

Note that the front detecting mechanism 7 of this embodiment is a mechanical detecting means equipped with the sensor plate 71, which is a contact member with which the card 2 makes contact, and the front sensor 72 for detecting the positional change of the sensor plate 71. Also, the rear detecting mechanism 8 of this embodiment is also a mechanical detecting means equipped with the sensor plate 81 with which the card 2 makes contact and the rear sensor 82 for detecting the positional change of the sensor plate 81, in the same manner as the front detecting mechanism 7. Also, the front detecting mechanism 7 of this embodiment is the first detecting means and the front sensor 72 is the first detecting section. The rear detecting mechanism 8 of this embodiment is the second detecting means which is arranged on the farther side than the front detecting mechanism 7 which is the first detecting means; the rear sensor 82 is the second detecting section.

When the card 2 has an IC chip thereon, the rear detecting mechanism 8 may detect that the card 2 has arrived while the leading edge of the card 2 engages with the holding member 46 and the IC contacts have made contact with the IC chip of the card 2. In the above description, the mechanical detecting mechanism is described as an example; however, the front detecting mechanism 7 and the rear detecting mechanism 8 may be the detecting mechanisms which detect the insertion of a card and the card's contacting of the far end using capacitance, electrical contact, or ultrasound.

FIG. 4 is a block diagram of the configuration of the control unit 12 mounted on the circuit board 9 of the card reader 1 and its peripherals shown in FIG. 1 through FIGS. 3A and 3B.

The card reader 1 includes a timer unit 11, the control unit 12, a memory unit 13 and an interface unit 14.

The timer unit 11 can set a measuring time, for example. The timer unit 11 is a real-time clock equipped with a crystal oscillator. The timer unit 11 also measures the time from the point at which the card 2 is detected by the front detecting mechanism 7 and/or the rear detecting mechanism 8. Note that a built-in timer of the control unit 12 may be used for the timer unit 11.

The control unit 12 is a control computation means for implementing controls over each section of the card reader 1. More specifically described, the control unit 12 controls each section integrally to control reading and writing of magnetic signals. The control unit 12 is configured by a control computation means called a CPU (Central Processing Unit) in this embodiment. The control unit 12 reads from and writes on the card 2 and communicates with the host device 19 installed in a game machine via the interface unit 14. Note that the control unit 12 may be equipped with a host control unit to control the host device 19 in which the card reader 1 is mounted.

Also, the magnetic head 6 is connected to the control unit 12. The control unit 12 is capable of implementing data processing of magnetic signals from the magnetic head 6 and decoding them. Also, the front sensor 72 and the rear sensor 82 are connected to the control unit 12 so that the output signals from the front sensor 72 and the output signals from the rear sensor 82 are input to the control unit. The control unit 12 also includes peripheral circuits for controlling other sections.

The memory unit 13 is a recording medium including a ROM (Read Only Memory) that stores various programs including the control program which is implemented by the control unit 12 and data and a RAM (Random Access Memory) which is a work area for the control unit 12. Note that the memory unit 13 may be equipped with non-volatile memory means such as flash memory or an HDD.

The control unit 12 also includes a status-monitoring section 100 as a function block. The status-monitoring section 100 detects a fraudulent operation by monitoring the relation of the detections at the front sensor 72 and at the rear sensor 82. More specifically described, the status-monitoring section 100 detects a fraudulent operation by judging whether the card 2 is detected at the front sensor 72 and the rear sensor 82. At that time, the status-monitoring section 100 may detect a fraudulent operation additionally using the detection of the output signals from the magnetic head 6.

More specifically described, the status-monitoring section 100 detects a fraudulent operation when the insertion of the card is detected by the front sensor 72 and the rear sensor 82 and the magnetic signals at a certain level or more are output from the magnetic head 6. The status-monitoring section 100 also detects a fraud, when the insertion of the card 2 is not detected by the front sensor 72, but if the insertion of the card 2 is detected by the rear sensor 82, judging that the front sensor 72 is abnormally operated. The status-monitoring section 100 also detects a fraudulent operation if the insertion of the card 2 is no longer recognized by the front sensor 72 under the condition where the insertion of the card 2 is detected by the front sensor 72 as well as by the rear sensor 82.

The status-monitoring section 100 is also equipped with an alarm unit 101 for notifying that the card 2 has processed illegally. The alarm unit 101 goes off when a card is not removed in a normal manner, i.e., when a fraudulent operation is detected by the status-monitoring section 100. The alarm unit 101 sends alarm to the host device 19 by a specific alarm command or a signal line. The alarm unit 101 can also send a signal to indicate that the card 2 remains in the middle of the card-storing section 4.

The control unit 12 implements a control program stored in the ROM in the memory unit 13 to enable the status-monitoring section 100 to function. The control unit 12 also implements a control program stored in the ROM of the memory unit 13 to enable the alarm unit 101 to function.

[Card Insertion Processing]

Referring to FIG. 5, the card insertion processing by the card reader 1 of the embodiment of the present invention is described. FIG. 5 is a flowchart of the control flow of the card reader 1 shown in FIG. 1. Also, the card insertion processing in FIG. 5 is the processing in a control method of a card processing device of this embodiment. In other words, the card insertion processing of this embodiment is an example of the control method used at the time of the insertion of the card 2. The card insertion processing is implemented such that the status-monitoring 100 of the control unit 12 mainly implements the control programs stored in the memory unit 13, cooperating with other sections, by using hardware resources. Referring to the flowchart in FIG. 5, the detail of the card insertion processing of this embodiment is hereinafter described step by step.

(Step S1)

First, the status-monitoring section 100 judges whether or not (Yes or No) the insertion of the card 2 from the card inserting opening has been detected at the front detecting mechanism 7, based on the output signals from the front sensor 72. When it is Yes, the status-monitoring section 100 advances the processing to Step S2. When it is No, the status-monitoring section 100 anticipates the detection of the insertion of the card 2 by the front detecting mechanism 7.

(Step 2)

Once the insertion of the card 2 from the card inserting opening is detected in Step 1, the status-monitoring section 100 starts the magnetic head 6 to read magnetic data recorded on the card 2.

(Step S3)

Then, the status-monitoring section 100 judges whether or not (Yes or No) the insertion of the card to the far end of the card reader 1 is detected at the rear detecting mechanism 8, based on the output signals from the rear sensor 82. In other words, the status-monitoring section 100 judges whether or not the insertion of the card 2 by a user is complete. When Yes, the status-monitoring section 100 advances the processing to Step S4. When No, the status-monitoring section 100 returns the processing to Step S2.

(Step S4)

Once the insertion of the card 2 to the far end of the card reader 1 is detected, the status-monitoring section 100 stops the magnetic head 6 reading the magnetic data on the card 23.

(Step S5)

Then, the status-monitoring section 100 transmits the signal indicating a normal insertion to the host device to notify that the card 2 is inserted to the card reader 1 by a normal operation. Once the normal-insertion signal is input to the host device 19, the host device 19 displays on a prescribed display unit a prompt for the user to remove the card 2 from the card reader 1. With the above operations, the card insertion processing of the embodiment of the present invention is finished.

[Card Removing Processing]

Referring to FIG. 6, a card removing processing by the card reader 1 of the embodiment of the present invention is next described. FIG. 6 is a flowchart of the control flow of the card reader 1 shown in FIG. 1. The card removing processing shown in FIG. 6 is a processing in the control method of the card processing device of this embodiment. In other words, the card removing processing of this embodiment is an example of the control method implemented at the time of the removal of the card 2. The card removing processing of this embodiment is implemented such that the status-monitoring 100 of the control unit 12 mainly implements the control programs stored in the memory unit 13, cooperating with other sections, by using hardware resources. Referring to the flowchart in FIG. 6, the detail of the card insertion processing of this embodiment is hereinafter described step by step.

(Step S6)

As described above, the display unit of the host device 19 displays the prompt for the user to remove the card 2 from the card reader 1. Then, when the user removes the card 2, the rear detecting mechanism 8 cannot detect the card 2 any longer and no detection signals are output from the rear sensor 82. Therefore, the status-monitoring section 100 judges whether or not (Yes or No) the detection signals have been output from the rear sensor 82. When Yes, the status-monitoring section 100 advances the processing to Step S12. When No, the status-monitoring section 100 advances the processing to Step S7.

(Step S7)

When the detection signals are no longer output from the rear sensor 82, the status-monitoring section 100 judges that the operation of the card removal has started, and therefore, sets the timer unit 11 at prescribed time and starts measuring the time.

(Step S8)

The status-monitoring section 100 judges whether the removal of the card 2 from the card inserting opening of the card-inserting section 3 is detected, based on the detection signals from the front sensor 72. In other words, the status-monitoring section 100 judges whether or not (Yes or No) the detection signals are output from the front sensor 72. Also, the status-monitoring section 100 judges it Yes even when the timer unit 11 measures more than the prescribed time. When Yes, the status-monitoring section 100 advances the processing to Step S9. When No, the status-monitoring section 100 refers to the timer unit 11 and waits until the prescribed time, which has been set, passes.

(Step S9)

When the removal of the card 2 is detected, the status-monitoring section 100 judges whether or not (Yes or No) the removal of the card 2 has happened within the prescribed time set at the timer unit 11. When Yes, the status-monitoring section 100 advances the processing to S10. When No, the status-monitoring section 100 advances the processing to Step S11.

(Step S10)

If the card 2 is removed within the prescribed time set at the timer 11, the status-monitoring section 100 judges that the card 2 has been removed in a normal operation and ends the card removal processing of this embodiment in a normal operation. At that time, the status-monitoring section 100 issues a signal indicating the processing ended normally to the host device 19. Then, the status-monitoring section 100 ends the card removing processing of this embodiment.

(Step S11)

If the removal of the card 2 took more than the prescribed time, i.e., beyond the prescribed time set at the timer unit, the status-monitoring section 100 judges that the card 2 stops and remains in the card-storing section 4 on the way out, and sends the host device 19 the signal to notify through the alarm unit that the card 2 has stopped and remains in the card-storing section 4.

When the signal to notify that the card has stopped and remains in the card-storing section is input to the host device 19, the host device 19 displays on the display unit a reminder that the card 2 has not been removed from the card reader 1. Alternately, a display is shown on the display unit to notify the user that maintenance is required.

(Step S12)

When the detection signals from the rear sensor 82 keeps coming in Step S6, the status-monitoring section 100 further judges if the removal of the card 2 from the card-inserting opening of the card-inserting section 3 is detected. More specifically described, when the detection signals from the front sensor 72 are being output (Yes), the status-monitoring section 100 judges that the card 2 has not been removed yet. When the detection signals from the front sensor 72 are no longer detected (No), the status-monitoring section 100 judges that the card 2 has been removed. When Yes, i.e., when the detection signals keep coming out from the front sensor 72, the status-monitoring section 100 advances the processing to Step S13. If No, i.e., when the detection signals are no longer output from the front sensor 72, the status-monitoring section 100 judges that the removal of the card 2 was illegally done, and advances the processing to Step S14.

(Step S13)

Even when the removal of the card 2 from the card-inserting opening is not detected by the front detecting mechanism 7, the status-monitoring section 100 judges whether or not (Yes or No) the output signals at a prescribed level or more from the magnetic head 6 is detected. When Yes, the status-monitoring section 100 judges that the removal of the card 2 was done illegally and advances the processing to Step S13. In other words, the magnetic head 6 outputs the magnetic signals recorded on the magnetic strip 2a as the magnetic strip slides against the magnetic head when the card 2 is moved in the inserting direction or in the removing direction. Therefore, when the magnetic signals at the prescribed level or more from the magnetic head 6 are detected although the level of the output signals from the rear sensor 82 and the front sensor 72 does not change, the status-monitoring section 100 judges that the inserted card 2 has been illegally removed. When No, the status-monitoring section 100 returns the processing to Step S6. In other words, even when the removal of the card 2 from the card-inserting opening of the card-inserting section is not detected by the front detecting mechanism 7 based on the output signals from the front sensor 72, but the output signals from the magnetic head 6 cannot be detected, the status-monitoring section 100 returns the processing to Step S6. At that time, a warning is issued on the display unit to prompt the user to remove the card 2 from the card reader 1.

(Step S14)

Then, the status-monitoring section 100 starts the alarm unit 101 and sends the host device 19 an alarm as the signals indicating an abnormal ending. Once the alarm is input to the host device 19, the host device 19 displays on the display unit a message to notify the user that the card reader 1 is unusable. Also, the host device 19 displays on the display unit a message to notify that maintenance is required, for example. With the above operations, the card removal processing of the embodiment of the present invention is finished.

Major Effects of This Embodiment

Configured in the above manner, the card processing device of at least an embodiment of the present invention can obtain the following effects. The card reader 1 of the embodiment of the present invention is a manual card processing device at which a user of a card processing device manually operates a card 2, and comprises the card-inserting section 3 at which a card 2 is inserted, the card-storing section 4 which stores the card while the rear end portion 22 of the inserted card 2 is exposed from the card-inserting section 3, the magnetic head 6 for reading information recorded on the magnetic strip 2a of the card 2 stored in the card-storing section 4, the front sensor 72 which detects that the card 2 is inserted to the card-storing section 4 from the card-inserting section 3, the rear sensor 8 which is arranged on the farther side in the inserting direction of the card 2 than the front sensor 72 to detect that the card 2 is inserted, and the status-monitoring section 100 which detects a fraudulent operation referring to the relation of the detections at the front sensor 72 and the rear sensor 82. There may be a situation in that the detection of the signals by the rear sensor 82 of the rear detecting mechanism 8 does not always happen after the signals are detected by the front sensor 72 of the front detecting mechanism 7 when the card 2 is inserted in a fraudulent operation; by configuring the card processing device of at least an embodiment of the present invention in the above manner, however, the host device 19 can be warned if the detection signals are output from the rear sensor 82 when the insertion of the card 2 is not detected at the front sensor 72. Thus, security measures against the fraudulent operation can be increased, compared to a conventional device.

The card reader 1 of the embodiment of the present invention is featured with the status-monitoring section 101 which is provided with the alarm unit 101 to notify that the card 2 is illegally processed. Even when a light-shielding object is pushed in together with the card 2 and is stuck inside, and therefore, the rear sensor 82 of the rear detecting mechanism 8 falsely detects the presence of the card and the removal of the card 2 cannot be detected, the card reader, equipped with the alarm unit, can issue an alarm notification at the moment when the detection signals are no longer output from the front sensor 72 of the front detecting mechanism 7. Also, even when a long, thin light-shielding object is inserted from a section, at which the front detecting mechanism 7 is not arranged, to obstruct the rear sensor 82 of the rear detecting mechanism 8 while the card reader is anticipating the insertion of the card 2, the alarm warning can be issued. As described, the alarm warning can be issued to notify the host device 19 of a sensor abnormality; therefore, the host device can know that the card reader 1 cannot continue the processing. Besides, it can judge that something might have happened to the inserted card 2.

The card reader 1 of this embodiment can monitor if somebody tampers with the card or card reader which is normally placed without anyone present. Therefore, before a next user uses the card reader 1, the host device 19 can detect something wrong and stop the processing of reading the card 2. In the situation of a normal insertion of the card 2 all the way to the rear detection mechanism 8, when the front sensor 72 of the front detecting mechanism 7 no longer outputs the detection signals when the card 2 is removed from the card-storing section 4 even if the rear detecting mechanism 8 keeps outputting the detection signals indicating that the card 2 is still there because of a fraudulent operation, the status-monitoring section can issue the alarm warning to notify the host device 19 of abnormal operation. In other words, the card reader 1 can respond to the situation where the removal of the card 2 cannot be confirmed at the rear detecting mechanism 8 when the card 2 is pulled out for a fraudulent purpose.

The card reader 1 of the embodiment of the present invention is also featured with the front sensor 72 of the front detecting mechanism 7 and the rear sensor 82 of the rear detecting mechanism 8 which are mechanical detecting means, respectively equipped with a contact member with which a card makes contact and a sensor for detecting the positional change of the contact member. Configured in this way, the front sensor 72 of the front detecting mechanism 7 can properly detect even a transparent card medium or a card medium with round corners outside of the standard, which is difficult to be detected by an optical detecting means which normally detects a card 2 as the card medium obstructs between the light-emitting element and the light-receiving element. Also, even when the sensor plate 71 which is the contact member wears out and cannot detect the contact of the card, the front detecting mechanism 7 can detect an abnormality based on the judgement result by the status-monitoring section 100.

In specific industries, the processing device performs the processing in which points are added for point information in the recorded information while the card 2 is inside the device. In the device that performs such a processing, an illegal processing in which a counterfeit card 2 replaces the legal card 2 may be implemented by tampering with the front detecting mechanism 7 and the rear detecting mechanism 8 so that, even when the normal card 2 is removed, it acts as if the card is not removed. With such a fraudulent operation, points are continually added although the legal card 2 has been removed. As a counter-measure, the card reader 1 of this embodiment is featured with a status-monitoring section 100 which detects the output signals from the magnetic head 6 as well as refers to the relation of the detections of the card at the front sensor 72 and at the rear sensor 82 to detect a fraudulent operation. By configuring the card reader 1 in this manner, the above-described illegal operation can be prevented.

When the magnetic signals which do not match with the detection condition indicated by the signals from the front detecting mechanism 7 and the rear detecting mechanism 8 are read, it is judged as an abnormal situation and a warning can be issued. Also, even when normal magnetic signals are read after the reading processing is made invalid due to an illegal card, a warning can be issued. More specifically described, even if the front detecting mechanism 7 and the rear detecting mechanism 8 are tampered with and the card 2 is slowly pulled out for a fraudulent purpose such as skimming, an alarm warning can be issued when a next user inserts a card 2. In other words, even if the removal of the illegal card is made undetected by fraud, when a next legal user of a card 2 inserts the card 2, magnetic signals are generated by the insertion operation or removal operation of the card, and those [signals] can be detected. By configuring the card reader 1 in this manner, a warning can be issued to a legal user even if the card reader 1 is tampered with for a fraudulent purpose.

Other Embodiments

The above-described embodiment is an example of an embodiment of the present invention; however, it is not limited to this embodiment, but can be varyingly modified within the range of the scope of the present invention.

The timer unit 11 may set a prescribed time and measure the time after the rear detecting mechanism 8 first detects that a card inserted from the card-inserting section 3 is pushed in all the way to the card stopping position and then the inserted card is removed from the rear detecting mechanism 8. In this case, the magnetic data read by the magnetic head 6 is edited, the prescribed time set by the timer unit 11 passes, and then the data stored in a read-data saving buffer may be deleted.

The above-described embodiment has described that, when monitoring the insertion of the card 2, the card reader 1 anticipates the front detecting mechanism 7 to detect the card and, after the front detecting mechanism 7 detects the insertion of the card, waits for the card to reach the rear detecting mechanism 8. In other words, when the front detecting mechanism 7 detects the insertion of the card, the card reader 1 judges if a light-shielding object is pushed into the far side. In addition to this, for monitoring the insertion of the card 2, the timer unit 11 may be configured to measure the prescribed time from the time of the detection of the insertion of the card 2 at the front detecting mechanism 7. In this case, if the card does not reach the rear detecting mechanism 8 and therefore cannot be detected by the rear detection mechanism 8 within the prescribed time, it is judged that the card has stopped in the middle of the card reader. By configuring the card reader in this way, a fraudulent operation can be detected even when a long, thin light-shielding object is inserted from a section where the front detecting mechanism 7 is not arranged to obstruct only the rear detecting mechanism 8 while the card reader is anticipating the insertion of a card 2.

In the above-described embodiment, when detecting the removal of the card 2 from the rear detecting mechanism 8, it is judged whether a warning should be issued, referring both to whether or not the detection signals are output from the front detecting mechanism 7 and to the detection of] the magnetic signals. However, the judgment on whether a warning should be issued may be made referring to either the signal detected at the front detecting mechanism 7 or the magnetic signal, or alternatively referring to another signal in addition to the signal detected at the front detecting mechanism 7 and the magnetic signal.

At the data processing unit, the output signals of the three kinds, a CLS (Card Loading Signal) signal, an RCP (Reading Clock Pulse) signal and an RDD (Reading Decode Data) signal, are output. The CLS signal is the card insertion signal indicating that the card 2 is inserted in the card reader 1, and is output based on the F2F signal from the magnetic head 6. The RCP signal is a standard clock signal. The RDD signal is a data signal containing the actually-recorded data.

For example, the status-monitoring section 100 may detect a fraudulent operation by detecting the value for the specific amount of the magnetic signal obtained from the magnetic head 6, which is set based on the duration of the card insertion signal and/or the clock number of the clock signal. By configuring the card reader in this manner, a fraudulent operation can be detected with certainty, even when the card 2 is removed for a fraudulent purpose, by detecting the magnetic signal generated after the removal of the card. In other words, a fraudulent operation can be detected more accurately, referring to the output of the detection signals at the front detecting mechanism 7 and the rear detecting mechanism 8 and to the CLS signal or RCP signal from the magnetic heard 6.

In this case, the status-monitoring section 100 may make a judgment by using the value set based on the duration of the CLS signal output and/or the clock frequency for the RCP signal as the specific amount of the magnetic signal from the magnetic head 6, which is processed at the data processing unit. The specific time measured by the timer unit 11 can be set to several seconds, for example.

Also, the status-monitoring section 100 may judge if the insertion of the card 2 is completed. For example, the status-monitoring section 100 detects the insertion of the card 2 to the far end of the card reader 1 with the signals from the rear sensor 82. In this case, when the rear sensor 82 outputs the detection signals, the status-monitoring section 100 judges that the insertion of the card 2 is completed. When the CLS signal is no longer output, the status-monitoring section 100 also judges that the operation of the card insertion is completed. For other occasions, the status-monitoring section 100 judges that the operation of the insertion of the card 2 is incomplete. By configuring the card reader in this manner, the issuing of a warning or the configuration of the card reader 1 can be flexibly changed.

In the above-described embodiment, an example is described in which a warning is issued in the process of card removal, involving the detection of a card 2 by the rear detecting mechanism 8 and the detection of the card 2 by the front detecting mechanism. However, a warning can be issued during the process of reading the card 2 by corresponding to the detection of the card 2 at the front detecting mechanism 7 and the detection of the card 2 at the rear detecting mechanism 8 in the same manner as the card-removal processing. By configuring the card reader in this manner, an alarm that warns of a possibility of a malicious act from outside can be sent to the host device 19 when the rear detecting mechanism 8 detects the insertion of the card 2 first while the detection of the card 2 at the front detecting mechanism 7 is still anticipated. In other words, it is possible to catch the danger that other users may be harmed by fraud in advance. As a result, a card reader of hand-operated style or card transfer style can be warned to prevent fraud.

Note that the configuration and operation of the above-described embodiments are examples and can be varyingly modified within the scope of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card processing device with which a user operates a card by hand, comprising:
    a card-inserting section at which said card is inserted;
    a card-storing section structured to store said card while a rear end portion of said inserted card is exposed from said card-inserting section;
    a reading section structured to read recorded information on said card stored in said card-storing section;
    a first detecting section structured to detect that said card is inserted to said card-storing section from said card-inserting section;
    a second detecting section, arranged on the farther side than said first detecting section in the inserting direction of said card, structured to detect that said card is inserted; and
    a status-monitoring section structured to detect fraud from the relation of the detections of said card at said first detecting section and said second detecting section, wherein
    the status-monitoring section detects a fraudulent operation in any of the following conditions:
        when a insertion of said card is detected by said first detecting section and said second detecting section and said recorded information signals at a certain level or more are output from said reading section,
        when a insertion of said card is not detected by said first detecting section, but if a insertion of said card is detected by said second detecting section, judging that said first detecting section is abnormally operated, or
        if a insertion of said card is no longer recognized by said first detecting section under a condition where a insertion of said card is detected by said first detecting section as well as by said second detecting section.

2. The card processing device as set forth in claim 1 wherein
said status-monitoring section comprises an alarm unit for notifying that said card is illegally processed.

3. The card processing device as set forth in claim 1, wherein
said first detecting section and said second detecting section are respectively a mechanical detecting means comprising a contact member, with which said card is to contact, and a sensor structured to detect the positional change of said contact member.

4. The card processing device as set forth in claim 1, wherein
said status-monitoring section is structured to detect an output signal from said reading section to detect fraud as well as refer to the relation of the detections of said card at said first detecting section and at said second detecting section.

5. The card processing device as set forth in claim 1, wherein
said first detecting section is a front sensor and said second detecting section is a rear sensor.

6. A control method of a card processing device, implemented by a manual card processing device with which a user operates a card by hand and which comprises a card-inserting section at which said card is inserted; a card-storing section which stores said card while a rear end portion of said inserted card is exposed from said card-inserting section; a reading section for reading recorded information on said card stored in said card-storing section; a first detecting section for detecting that said card is inserted to said card-storing section from said card-inserting section; and a second detecting section, arranged on the farther side than said first detecting section in the inserting direction of said card for detecting said card is inserted; the method comprising:
detecting, with the first detecting section, that said card is inserted to said card-storing section;
detecting, with said second detecting section, that said card is inserted; and
detecting an illegal operation by referring to the relation of the detections of said card at said first detecting section and at said second detecting section, wherein
said detecting the illegal operation detects a fraudulent operation in any of the following conditions:
when a insertion of said card is detected by said first detecting section and said second detecting section and said recorded information signals at a certain level or more are output from said reading section,
when a insertion of said card is not detected by said first detecting section, but if a insertion of said card is detected by said second detecting section, judging that said first detecting section is abnormally operated, or
if a insertion of said card is no longer recognized by said first detecting section under a condition where a insertion of said card is detected by said first detecting section as well as by said second detecting section.

7. The control method as set forth in claim 6, wherein
said first detecting section is a front sensor and said second detecting section is a rear sensor.

* * * * *